United States Patent [19]
Kennedy et al.

[11] Patent Number: 5,333,151
[45] Date of Patent: Jul. 26, 1994

[54] HIGH SPEED FREQUENCY-SHIFT KEYING DECODER

[75] Inventors: John F. Kennedy, Garden City; Robert D. Plowdrey, Livonia, both of Mich.

[73] Assignee: Ford Motor Company, Dearborn, Mich.

[21] Appl. No.: 980,071

[22] Filed: Nov. 23, 1992

[51] Int. Cl.⁵ ............................................. H04L 27/14
[52] U.S. Cl. ..................................... 375/88; 329/303; 329/337; 455/337
[58] Field of Search .................. 375/45, 88, 9, 94, 95; 329/300, 303, 301, 327, 336, 337, 343; 375/94, 95; 455/334, 337

[56] References Cited

U.S. PATENT DOCUMENTS

| | | | |
|---|---|---|---|
| 3,017,464 | 1/1962 | Broughtwood et al. | 178/88 |
| 3,470,478 | 9/1969 | Crafts | 329/303 |
| 3,569,845 | 3/1971 | Steinberg | 329/110 |
| 3,601,710 | 8/1971 | Morra | 329/303 |
| 3,739,288 | 6/1973 | Coccagna | 329/109 |
| 4,193,034 | 3/1980 | Vance | 375/88 |
| 4,335,354 | 6/1982 | Crandall et al. | 329/303 |
| 4,472,816 | 9/1984 | Thompson | 375/80 |
| 4,571,738 | 2/1986 | Vance | 375/82 |
| 5,155,446 | 10/1992 | Eberle | 329/300 |

FOREIGN PATENT DOCUMENTS

| | | |
|---|---|---|
| 2516679 | 4/1975 | Fed. Rep. of Germany . |
| 56-156012 | 12/1981 | Japan . |
| 2032737 | 5/1980 | United Kingdom . |

*Primary Examiner*—Stephen Chin
*Assistant Examiner*—Don Vo
*Attorney, Agent, or Firm*—Mark Mollon; Roger L. May

[57] ABSTRACT

A frequency-shift keying (FSK) signal detector splits an FSK signal into two paths. In one path, a phase-altering circuit having a variable frequency characteristic between the two encoding frequencies of the FSK signal provides either a phase lead or a phase lag depending upon the instantaneous frequency of the FSK signal. The phase-altered signal is sampled in response to the signal in the second path to decode a digital signal.

8 Claims, 1 Drawing Sheet

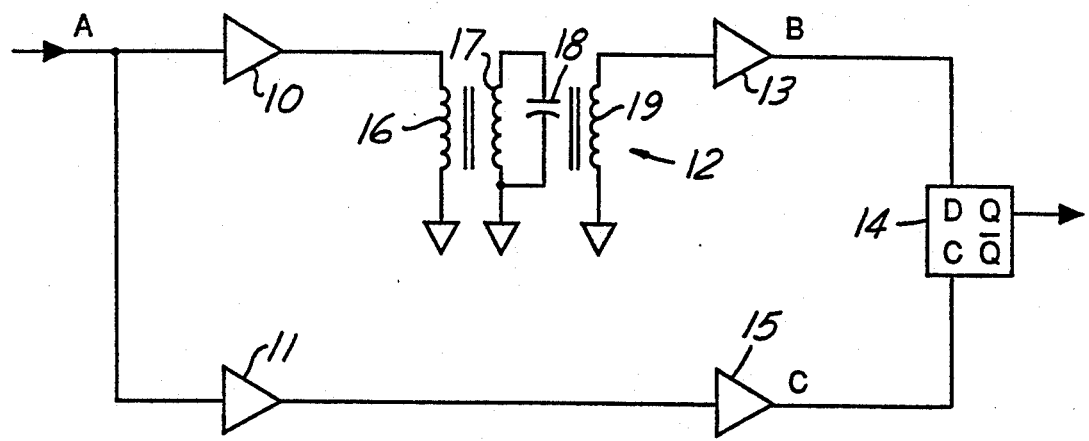
FIG.1
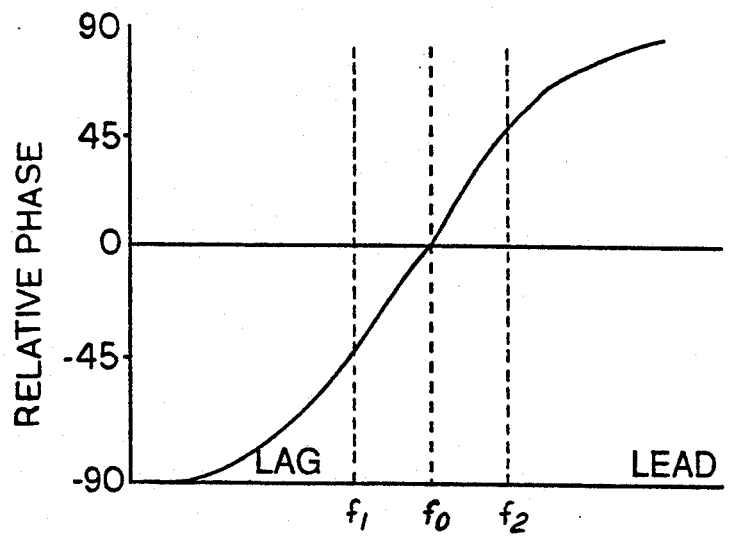
FIG.2
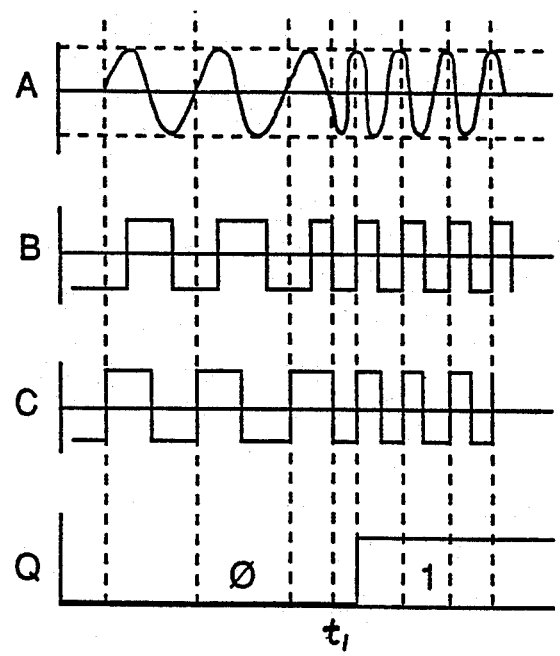
FIG.3
FIG.4
FIG.5
FIG.6

HIGH SPEED FREQUENCY-SHIFT KEYING DECODER

BACKGROUND OF THE INVENTION

The present invention relates in general to decoding frequency-shift keying (FSK) signals, and more specifically to an FSK decoding scheme having a fast response time by avoiding integration in the decoder.

Frequency-shift keying is a well-known method for representing binary data using a first frequency to represent a binary zero and a second frequency to represent a binary one. When the binary digit to be represented changes, the frequency of the FSK signal shifts from one frequency to the other. Although the frequency shifts abruptly, FSK systems typically employ a continuous phase, i.e., there is no phase discontinuity when the frequency shifts.

Frequency-shift keying is a type of frequency modulation and can be used to transmit digital information by radio waves. FSK modulation is also used in transmitting binary information over phone lines using modems.

Demodulation of FSK signals typically employs FM detection techniques which include filtering with long time constants or other integration of the FSK signal. For example, the FSK signal to be demodulated is applied to the inputs of a pair of bandpass filters having respective center frequencies corresponding to the two frequencies of the FSK signal. The filter outputs are coupled to the inputs of a differential amplifier which recreates the digital signal. However, the integration time constants of the filters introduce a time delay slowing down the response time of the FSK demodulator.

Other demodulation techniques rely on the use of quadrature mixing signals to generate quadrature and in-phase FSK components for detection, resulting in high part count and high cost.

SUMMARY OF THE INVENTION

The invention has the object and advantage of decoding FSK signals at high speed with a low part count and a low cost.

Specifically, the invention decodes an FSK signal which modulates between a first frequency $f_1$ and a second frequency $f_2$ to encode digital information. Wave-shaping means shape the FSK signal to generate substantially identical first and second wave-shaped signals. Phase-altering means receives the first wave-shaped signal for generating a phase-altered signal. The phase-altering means has a frequency response at frequency $f_1$ different from its frequency response at frequency $f_2$. Sampling means samples one of the phase-altered signal or the second wave-shaped signal in response to a transition in the other one of the phase-altered signal or the second wave-shaped signal to generate a decoded signal. In a preferred embodiment, the phase-altering means is comprised of a resonant circuit having a resonant frequency $f_0$ substantially halfway between $f_1$ and $f_2$. The sampling means is preferably comprised of a D-type flip-flop.

BRIEF DESCRIPTION OF THE DRAWINGS

FIG. 1 is a schematic diagram showing a decoder according to the present invention.

FIG. 2 is a frequency response curve provided by the tank circuit of FIG. 1.

FIGS. 3–6 show waveform diagrams at respective points in the circuit of FIG. 1 during operation.

DETAILED DESCRIPTION OF PREFERRED EMBODIMENTS

As shown in FIG. 1, an input FSK signal A obtained from an antenna, phone line, or other source (not shown) is coupled to the input of an amplifier 10 and the input of an amplifier 11. The output of amplifier 10 is connected to the input of a resonant circuit 12. The output of resonant circuit 12 is connected to the input of an amplifier 13. An output signal B from amplifier 13 is connected to the D input of a D-type flip-flop 14. The output of amplifier 11 is connected to the input of an amplifier 15 which produces a C output signal coupled to the C input of D flip-flop 14.

Resonant circuit 12 includes an inductor 16 inductively coupled to an inductor 17. A capacitor 18 is connected in parallel with inductor 17. An inductor 19 is magnetically coupled to inductor 17 and provides the output of the resonant circuit 12. In this preferred embodiment, resonant circuit 12 takes the form of a tank circuit which is a parallel resonant circuit having a resonant frequency $f_0$ at a frequency between the frequencies $f_1$ and $f_2$ used by the FSK signal to encode binary digits. Resonant circuit 12 has a high Q factor (by virtue of a low effective series resistance) in order to insure very low integration of the FSK signal. Consequently, resonant circuit 12 alters the phase of the FSK signal but introduces very little time delay, thus enabling fast decoding of the FSK signal.

As shown in FIG. 2, resonant circuit 12 provides a relative phase change according to the frequency of its input signal. At frequency $f_1$, the resonant circuit introduces a phase lag. At frequency $f_2$, a phase lead is introduced. Although phase shifts of about 45° provide the best accuracy of detection, much smaller relative phase shifts can be employed using the decoder of the present invention.

Amplifiers 10, 11, 13, and 15 are comprised of very high gain amplifiers yielding nonlinear amplification to produce square-wave signals which indicate transitions in the respective input signals. Other forms of square-wave generators can alternatively be employed, such as zero crossing detectors.

The input FSK signal A is shown in FIG. 3 which shifts from frequency $f_1$ to frequency $f_2$ at a time $t_1$. FSK signal A is amplified and limited in amplifiers 10 and 11 to produce wave-shaped (i.e., square-wave) signals indicating zero crossings of FSK signal A. Prior to time $t_1$ while FSK signal A has a frequency $f_1$, resonant circuit 12 introduces a phase lag resulting in output signal B relative to FSK signal A as shown in FIG. 4.

Amplifiers 11 and 15 provide an output signal C, shown in FIG. 5, which is identical to the output signal produced at B except for the phase alteration introduced by resonant circuit 12.

Flip-flop 14 receives output signal C at its clock input C so that output signal B is sampled at each positive transition in output signal C. Output signal B applied to the D input of flip-flop 14 is shifted in phase relative to output signal C depending upon whether the FSK signal is transmitted at $f_1$ or $f_2$. Due to the phase shift, flip-flop 14 will provide an output signal Q according to the phase difference. As shown in FIG. 6, output signal Q switches to a high output signal after a short time delay following time $t_1$. This delay is due to residual stored energy in the tank circuit.

In the preferred embodiment of FIG. 1, amplifiers 10, 11, 13 and 15 have a slew rate and a bandwidth product at least ten times greater than frequency $f_2$. Providing a Q factor for resonant circuit 12 of about 300, the present invention was able to detect a shift in the FSK frequency within three cycles of the FSK signal. Even faster detection can be obtained if desired using a resonant circuit with a higher Q factor.

It will be apparent to those skilled in the art that other types of resonant phase-altering devices can be employed other than the tank circuit, such as a ceramic filter, a crystal or a SAW filter. In addition, nonresonant circuits can be employed to introduce the necessary phase difference, such as high-pass or low-pass RC filters.

Flip-flop 14 could be replaced with other known sample-and-hold devices. Furthermore, the inputs to flip-flop 14 could be reversed, resulting in the inversion of the decoded output signal.

What is claimed is:

1. Apparatus for decoding a frequency-shift keying (FSK) signal which modulates between a first frequency $f_1$ and a second frequency $f_2$ to encode digital information, comprising:
   wave-shaping means for shaping said FSK signal to generate substantially identical first and second wave-shaped signals;
   an LC tank circuit receiving said first wave-shaped signal for generating a phase-altered signal, said LC tank circuit having a resonant frequency $f_0$ between said first frequency $f_1$ and said second frequency $f_2$; and
   sampling means for sampling one of said phase-altered signal or said second wave-shaped signal in response to a transition in the other one of said phase-altered signal or said second wave-shaped signal to generate a decoded signal.

2. The apparatus of claim 1 wherein said wave-shaping means includes means for generating a square-wave signal having transitions in response to zero crossings of said FSK signal.

3. The apparatus of claim 1 wherein said wave-shaping means is comprised of a nonlinear amplifier.

4. The apparatus of claim 1 wherein said resonant frequency $f_0$ is substantially halfway between said first frequency $f_1$ and said second frequency $f_2$.

5. The apparatus of claim 1 wherein said resonant circuit is comprised of a tank circuit with substantially no integration.

6. The apparatus of claim 1 wherein said sampling means is comprised of a D-type flip-flop having one of said phase-altered signal or said second wave-shaped signal coupled to its D input and having the other one of said phase-altered signal or said second wave-shaped signal coupled to its clock input.

7. A method for decoding a frequency-shift keying (FSK) signal which modulates between a first frequency $f_1$ and a second frequency $f_2$ to encode digital information, comprising the steps of:
   generating substantially identical first and second wave-shaped signals in response to said FSK signal;
   phase-altering said first wave-shaped signal to generate a phase-altered signal either leading or lagging said second wave-shaped signal depending on whether said first wave-shaped signal exhibits said frequency $f_1$ or said frequency $f_2$ by coupling said first wave-shaped signal to an LC tank circuit having a resonant frequency $f_0$ between said first frequency $f_1$ and said second frequency $f_2$; and
   sampling one of said phase-altered signal or said second wave-shaped signal in response to a transition in the other one of said phase-altered signal or said second wave-shaped signal to generate a decoded signal.

8. Apparatus for decoding a frequency-shift keying (FSK) signal which modulates between a first frequency $f_1$ and second frequency $f_2$ to encode digital information, comprising:
   a first signal path receiving said FSK signal including the series connection of a first amplifier, an LC tank circuit, and a second amplifier to generate a phase-altered signal, said LC tank circuit having a resonant frequency $f_0$ between said first frequency $f_1$ and said second frequency $f_2$;
   a second signal path receiving said FSK signal including the series connection of a third amplifier and a fourth amplifier to generate a reference signal; and
   a flip-flop responsive to said phase-altered signal and said reference signal to generate a decoded signal representing said digital information.

* * * * *